United States Patent
Strait et al.

(10) Patent No.: US 6,659,756 B2
(45) Date of Patent: Dec. 9, 2003

(54) SYSTEM FOR PREPARING POLYMER ENCAPSULATED GLASS FIBER PELLETS

(75) Inventors: Michael A. Strait, Johnstown, OH (US); Homer G. Hill, Newark, OH (US); Robert A. Schweizer, Howard, OH (US); Stephen Seng, Howard, OH (US); Leonard J. Adzima, Pickerington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 76 days.

(21) Appl. No.: 10/010,585

(22) Filed: Nov. 13, 2001

(65) Prior Publication Data

US 2002/0119310 A1 Aug. 29, 2002

Related U.S. Application Data

(62) Division of application No. 09/356,354, filed on Jul. 16, 1999, now Pat. No. 6,365,090.

(51) Int. Cl.⁷ ................................................. B29C 67/02
(52) U.S. Cl. ........................................ 425/222; 65/483
(58) Field of Search ............................. 425/222; 65/483

(56) References Cited

U.S. PATENT DOCUMENTS

| | | |
|---|---|---|
| 3,991,225 A | 11/1976 | Blouin |
| 4,037,011 A | 7/1977 | Hattori et al. |
| 4,407,866 A | 10/1983 | Kitamura et al. |
| 4,425,376 A | 1/1984 | Lee |
| 4,840,755 A | 6/1989 | Nakazawa et al. |
| 4,997,681 A | 3/1991 | Dockrill et al. |
| 5,868,982 A | 2/1999 | Strait et al. |
| 5,945,134 A | 8/1999 | Strait et al. |
| 6,148,641 A | 11/2000 | Blough et al. |
| 6,365,090 B1 * | 4/2002 | Strait et al. .................. 264/494 |
| 2002/0119310 A1 * | 8/2002 | Strait et al. .................. 428/361 |

FOREIGN PATENT DOCUMENTS

WO      WO 98/43920      10/1998

* cited by examiner

*Primary Examiner*—Cynthia H. Kelly
*Assistant Examiner*—J. M. Gray
(74) *Attorney, Agent, or Firm*—Inger H. Eckert; Stephen W. Barns

(57) ABSTRACT

A process and apparatus for making densified glass fiber pellets substantially encapsulated in a polymeric shell from chopped segments of multi-filament glass strand is described. The densified pellets may be advantageously produced by hydrating chopped glass strands and then pelletizing them by tumbling in a rotary drum, densifying the resulting pellets by tumbling in a rotating zig-zag or undulating tube, drying the pellets and encapsulating them in a polymeric composition. The resulting pellets exhibit enhanced degradation resistance during bulk storage and handling.

15 Claims, 8 Drawing Sheets

SYSTEM FOR PREPARING POLYMER ENCAPSULATED GLASS FIBER PELLETS

CROSS REFERENCE TO RELATED APPLICATION(S)

This application is a divisional of U.S. Ser. No. 09/356,354, filed Jul. 16, 1999 now U.S. Pat. No. 6,365,090, hereby incorporated by reference.

The present invention relates to the manufacture of glass fiber pellets. In particular, the present invention provides an apparatus and process for making polymer coated glass fiber pellets by combining multiple segments of a chopped multi-fiber glass strand into pellets and encapsulating the pellets in a polymer shell. Such pellets provide a convenient form for the storage and handling of chopped glass fibers used as reinforcing materials in composite structures.

BACKGROUND OF THE INVENTION

Chopped glass fibers are commonly used as reinforcement materials in thermoplastic articles. Typically, such fibers are formed by drawing molten glass into filaments through a bushing or orifice plate, applying a sizing composition containing lubricants, coupling agents and film-forming binder resins to the filaments, gathering the filaments into strands, chopping the fiber strands into segments of the desired length, and drying the sizing composition. These chopped strand segments are thereafter mixed with a polymeric resin, and the mixture supplied to a compression- or injection-molding machine to be formed into glass fiber reinforced plastic articles. Typically, the chopped strands are mixed with pellets of a thermoplastic polymer, and the mixture supplied to an extruder wherein the resin is melted, the integrity of the glass fiber strands is destroyed and the fibers are dispersed throughout the molten resin, and the fiber/resin dispersion is formed into pellets. These pellets are then fed to the molding machine and formed into molded articles having a substantially homogeneous dispersion of the glass fibers throughout.

Unfortunately, however, chopped glass fibers made via such processes are typically bulky and do not flow well. Consequently, such fibers are difficult to handle and have been problematic in automated processing equipment.

One attempt at solving this problem has been to compact the chopped strands into denser rod-shaped bundles or pellets to improve the flowability of the chopped strands, and enable the use of automated equipment to weigh and transport the glass fibers for mixing with the thermoplastic resins. Such a process is disclosed in U.S. Pat. No. 4,840,755, wherein wet chopped strands are rolled, preferably on a vibrating carrier, to round the strands and compact them into denser, cylindrically shaped pellets. While such methods and apparatus tend to provide denser, more cylindrically shaped pellets exhibiting better flowability, they are undesirably limited in certain respects.

For example, the pellet size and fiber content are generally limited by the size and number of fibers in the chopped strand, in that the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the strand from which the segments are chopped usually must be formed of a large number of filaments. However, increasing the number of filaments required to be formed and combined into a single strand undesirably complicates the forming operation.

In an attempt to overcome these shortcomings, U.S. Pat. No. 5,578,535 discloses glass fiber pellets that are from about 20 to 30 percent denser than the individual glass strands from which they are made, and from about 5 to 15 times larger in diameter. These pellets are prepared by hydrating cut strand segments to a level sufficient to prevent filamentization but insufficient to cause the strand segments to agglomerate into a clump, and mixing the hydrated strand segments for a time sufficient to form pellets. Suitable mixing includes a process that will keep the fibers moving over and around one another, such as tumbling, agitating, blending, commingling, stirring and intermingling.

Although the disclosed pellets can be made by such diverse mixing processes, it has been discovered that many of such processes are either too inefficient to be used commercially, or cannot be adequately controlled to produce a uniform pellet product that provides the resulting composite article with strength characteristics comparable to those made from nonpelleted chopped strand fibers. For example, the use of a modified disk pelletizer frequently results in excessive residence time of the formed pellets within the mixer, which in turn results in degradation of the pellets due to the abrasive nature of glass fiber pellets rubbing against one another. Such pellet degradation ultimately reduces the strength characteristics of the molded articles made therewith.

However, an efficient pellet-forming process and apparatus that controllably yields a uniform glass fiber pellet product that provides strength characteristics equal to non-pelleted chopped strand fibers in composite molded articles has previously been disclosed in U.S. patent application Ser. Nos. 08/975,729 and 08/831,129. In such apparatus and process, glass fiber strands comprised of a multiplicity of substantially continuous glass fibers are chopped into segments of the desired length and hydrated to a moisture content sufficient to cause the strand segments to coalesce into pellets upon tumbling. Thereafter, the strand segments are subjected to a first tumbling action to distribute the hydrating solution substantially uniformly over the strand segments and to cause the strand segments to combine to form pellets. The density of the pellets is then increased by compacting the pellets by a second tumbling action. This process can be performed by an apparatus comprising: (a) means for cutting the glass fiber strands to form chopped strand segments; (b) means for conveying the chopped strand segments to a first tumbling means; (c) means for applying a hydrating solution to the chopped strand segments; (d) a first tumbling means for imparting a tumbling action to the chopped strand segments to disperse the hydrating solution and cause the chopped strand segments to align and coalesce into pellets; (e) means for conveying the pellets to a second tumbling means; (f) a second tumbling means for tumbling the pellets to compact them and increase their density; (g) means for conveying the densified pellets to a dryer; and (h) a drying means adapted to receive and dry the pellets.

While such a process and apparatus provide numerous advantages in the preparation of chopped glass fiber pellets for use as reinforcement in molded polymer compositions, such pellets may still experience degradation during processing, storage and handling prior to compounding. Such degradation may result in pellets breaking open prematurely, resulting in the release of filaments or fuzz that can accumulate and block or impede the flow of pellets through conveyors or processing equipment. Moreover, such degradation may result in actual breakage of fibers thereby causing a reduction in the average length of the fibers in the composite article, and a consequent reduction in the physical properties of the composite article.

Accordingly, a need remains for a means of imparting greater impact resistance and toughness to the resulting pellets to reduce the degradation such pellets experience during storage and handling prior to compounding and molding. Such a need is fulfilled by the invention described in detail below.

SUMMARY OF THE INVENTION

According to the present invention, the exterior surface of the glass fiber pellets are coated with a polymeric binder composition, which, upon setting, hardening or curing (hereinafter referred to collectively as "curing"), imparts increased structural integrity and toughness to the resulting pellets. The substantial encapsulation of the pellets in the cured binder improves the ability of the pellets to be stored and transported with reduced pellet degradation. Additionally, the presence of the binder coating on the pellet surface allows the pellets to travel further through the extruder during compounding before dispersion of the bundle occurs. This typically results in an increase in the average fiber length of the reinforcing fibers in the composite, which usually results in better physical properties. Further, because of the presence of this exterior coating, the pellets can be formed from strands with reduced binder loadings and corresponding lower strand integrity, which provides for quick dispersion of the fibers once the outer shell is broken. Moreover, because the binder is being applied to the outside of the formed pellets, the quantity of binder required to provide the desired integrity is typically lower than that which would be required if the binder was applied to the individual strands prior to or during pellet formation. Consequently, applying the binder to the pellet surface can reduce the overall percentage of binder in the pellets, which provides obvious economic benefits.

In the process of the invention, the pellets are coated with a curable binder composition after their formation, which, after curing, provides a glass fiber pellet that is substantially encapsulated in a thin film or shell of polymeric binder. Such pellets exhibit enhanced toughness and ability to withstand handling with reduced degradation, yet disperse quickly during compounding once the shell is broken. If the pellets are oven-dried, it can be advantageous to apply the binder to the pellets as they exit the drying oven. Applying the binder in this manner permits use of the heat contained within the pellets exiting the oven to evaporate any solvents or liquid carriers in the binder composition, which obviates the need for a secondary drying process to dry the binder, and helps cool the pellets for storage or packaging. Additionally, if the binder is heat-curable, the heat contained within the pellets can cure the binder. Alternatively, a light-curable binder may be applied to the pellets after they are dried which can be cured by passing the binder coated pellets through a suitable light chamber to cure the binder composition prior to storage or packaging.

DETAILED DESCRIPTION AND PREFERRED EMBODIMENTS OF THE INVENTION

Figure 1A:
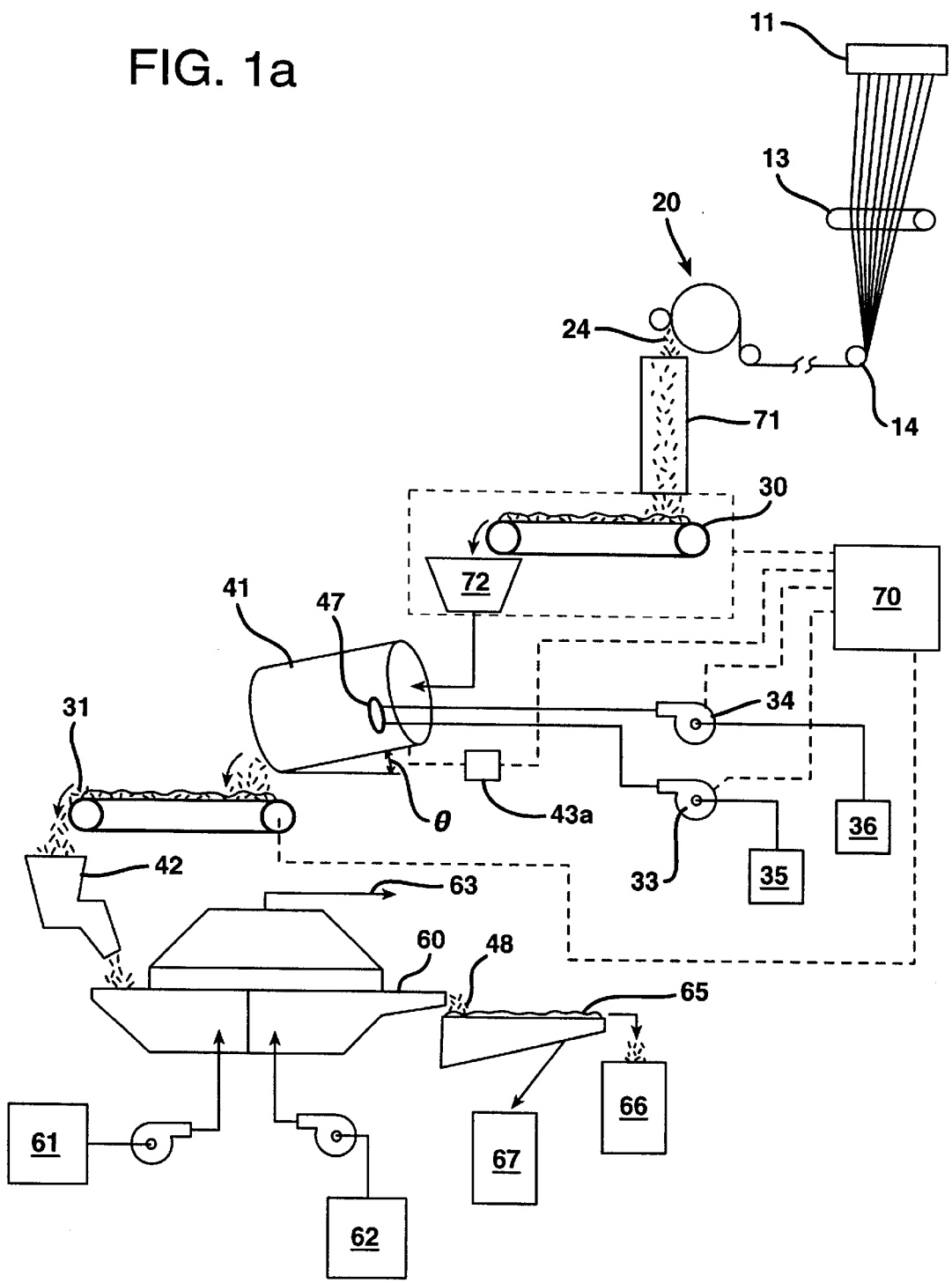
FIG. 1a is an illustration of a rotary drum pelletizing system useful in the invention.

In the process of the invention, a strand of substantially continuous glass fibers is formed by conventional techniques such as drawing molten glass through a heated bushing to form a multitude of substantially continuous glass fibers and collecting the fibers into a strand. Any suitable apparatus for producing such fibers and collecting them into a strand can be used in the present invention.

Suitable fibers are fibers having a diameter of from about 3 microns to about 90 microns, and suitable strands contain from about 50 fibers to about 2000 fibers. Preferably, the strands formed in the process of the invention contain from about 400 fibers to about 800 fibers having a diameter of from about 3 microns to about 23 microns.

After the fibers are formed, and prior to their collection into a strand, the fibers may be coated with a suitable aqueous sizing composition, such as one known in the art. Preferably, the sizing composition consists essentially of water, one or more coupling agents, and optionally, one or more lubricants and pH adjusters.

Suitable coupling agents include organofunctional silanes, such as those available from Witco under the following trade designations:

| A-154 | Methyl-trichloro-silane | $MeSiCl_3$ |
| A-163 | Methyl-trimethoxy-silane | $MeSi(OCH_3)_3$ |
| A-189 | γ Mercaptopropyl-trimethoxy-silane | $HS(CH_2)_3Si(OCH_3)_3$ |
| A-143 | γ Chloropropyl-trimethoxy-silane | $Cl(CH_2)_3Si(OMe)_3$ |
| A-151 | Vinyl-triethoxy-silane | $CH_2=CHSi(OC_2H_5)_3$ |
| A-172 | Vinyl-tris-(2-methoxyethoxy)silane | $CH_2=CHSi(OCH_2CH_2OCH_3)_3$ |
| A-188 | Vinyl-triacetoxy silane | $CH_2=CHSi(OOCCH_3)_3$ |

-continued

| | | |
|---|---|---|
| A-1100 | γ-(Amino)-propyl-triethoxy-silane | $H_2N(CH_2)_3Si(OC_2H_5)_3$ |
| A-1120 | n-(Trimethoxy-silyl-propyl-ethylene-diamine) | $H_2N(CH_2)_2NH(CH_2)_3Si(OCH_3)_3$ |
| A-174 | γ-(Methacryloxy)propyl-triethoxy-silane | 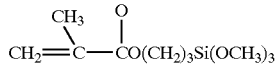 |
| A-187 | γ-Glycidoxy-propyl-trimethoxy-silane | 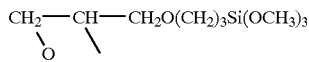 |

Preferred coupling agents for use in the invention are 3-aminopropyltriethoxy-silane and gamma-glycidoxypropyltrimethoxy-silane commercially available from OSi of Witco under the trade designations A-1100 and A-187, respectively. Preferably, the organofunctional silanes are used in an amount of from about 0.1 percent to about 1.0 percent of the sizing composition.

Any suitable lubricant may be used in the sizing composition, such as water-soluble ethyleneglycol stearates, ethyleneglycol oleates, ethoxylated fatty amines, glycerine, emulsified mineral oil, and organo polysiloxane emulsions. Preferred lubricants include: polyethyleneglycol monostearate; polyethyleneglycol mono-oleate; butoxyethyl stearate; stearic ethanolamide (Lubsize K12, available from Alpha/Owens Corning); a lubricant disclosed in U.S. Pat. No. 3,597,265, the disclosure of which is incorporated by reference herein (available from Emery Corp. under the trade designation Emerlube 6760); and a blend of 30% white oil, 30% polyethylene glycol 400 monopelargonate, 30% polyoxyethylene (3) myristic alcohol, and 10% ethoxylated alkyl amine (Parastat S-2) (Emerlube 7607, available from Emery Corp.). Preferably, the lubricant is present in the sizing composition in an amount of from about 0.05 percent to about 0.10 percent by weight.

Additionally, small amounts of weak acids, such as acetic acid, may be added to the sizing composition to lower the pH of the composition to from about 3.5 to about 8. Preferably, such acids are present in the composition in an amount of from about 0.15 percent to about 0.3 percent by weight, and the pH of the composition is from about 6 to about 8.

Suitable sizing compositions for the invention include:

| | | |
|---|---|---|
| 1. | A-1100 organofunctional silane (58% active content) | 0.5% |
| | Deionized water | Balance |
| | A-1100 organofunctional silane (58% active content) | 0.5% |
| | Lubsize K12 (Alpha/Owens Corning) | 0.07% |
| | Glacial acetic acid | to pH of 6 to 8 |
| | Deionized water | Balance |
| 3. | A-1100 organofunctional silane (58% active content) | 0.5% |
| | Emerlube 7607 (Emery Corp.) | 0.1% |
| | Deionized water | Balance |
| 4. | A-1100 organofunctional silane (58% active content) | 0.5% |
| | Polyethylene glycol 400 monostearate | 0.1% |
| | Deionized water | Balance |
| 5. | A-1100 organofunctional silane (58% active content) | 0.5% |
| | Emerlube 6760U (Emery Corp.) | 0.01% |
| | Deionized water | Balance |
| 6. | A-1100 organofunctional silane (58% active content) | 0.38% |
| | A-187 organofunctional silane | 0.12% |
| | Deionized water | Balance |

The aqueous sizing composition can be applied by conventional means, using any one of several coating applicators. Coating applicators suitable for use in the invention include roll applicators, immersion baths, brushes and sprayers. Preferably, the sizing composition is applied by passing the fibers over a kiss roll applicator. Moreover, the sizing is preferably applied to the fibers in an amount sufficient to provide the fibers with a moisture content of from about 8 percent to about 13 percent, more preferably about 11% (unless indicated otherwise, all percentages herein are by weight).

Once formed and coated with the sizing, the continuous strands are chopped into lengths of from about one-eighth inch (3.175 mm) to one and one-fourth inch (31.75 mm) and formed into pellets. Any suitable means known in the art for chopping glass fiber strands into such lengths and forming pellets from the chopped strand segments can be used in the process.

Preferably, the moisture content of the chopped strand segments is adjusted to a level suitable for the formation of pellets when the chopped stand segments are caused to move over and around one another, and the chopped strand segments are introduced into a tumbler or pelletizer, which imparts such motion to the strand segments. While the moisture content of the strand segments can be adjusted prior to their introduction into the pelletizer, it is preferred that the glass fibers are hydrated to a moisture content suitable for pellet formation in the pelletizer. Preferably, the moisture content of the fibers in the pelletizer is from about 12 percent to about 16 percent, more preferably from about 13 percent to about 14 percent. If the moisture content is too low, the strands tend not to combine into pellets and will remain in a typical strand formation. Conversely, if the moisture content is too high, the strands tend to agglomerate or clump or form pellets of too large a diameter and an irregular, noncylindrical shape.

A second fluid or solution is applied to the fibers after they are cut into the desired lengths and before they are formed into pellets. This fluid is a hydrating fluid that preferably also contains a binder or second sizing composition. The hydrating fluid may thus contain suitable components, such as those typically included in glass fiber sizing compositions, e.g., film formers, wetting agents, anti-static agents, and additional coupling agents and lubricants. By applying this fluid containing sizing type ingredients in the pelletizer, an application efficiency of 100% may be attained. Moreover, applying the hydrating fluid outside of the fiber-forming environment permits the inclusion of materials that are not desirably applied during the forming process because of toxicity, cleanliness, odor, high cost, or shear sensitivity.

Examples of suitable binder compositions that can be incorporated into the hydrating fluid include the following compositions (unless indicated otherwise, all percentages are by weight):

| | | |
|---|---|---|
| 1. | EpiRez 3544 - epoxy water dispersion at 53% resin solids (Shell Chemical Co). | 12.58% |
| | Witco 290 H - polyurethane water dispersion at 62% resin solids (Witco Co.) | 0.99% |
| | A-1100 organofunctional silane at 58% active solids (Witco Co.) | 0.10% |
| | Deionized water | Balance |
| 2. | Size compositions described in U.S. Pat. No. 5,236,982, the disclosure of which is incorporated by reference herein. | |
| 3. | Terephthalic Acid | 3.21% |
| | Ammonium hydroxide at 28% active content | 3.89% |
| | GenFlo 559 - polyurethane water dispersion at 50% resin solids (General Tire and Rubber Co.) | 4.06% |
| | ChemCor 43N40 polypropylene water dispersion at 40% resin solids (Chemical Corporation of America) | 8.12% |
| | Deionized water | Balance |
| 4. | Z6020 - organofunctional silane (Dow Corning Corp.) | 2.65% |
| | Pluronic 10R5 - block copolymer of ethylene oxide and propylene oxide (BASF Corp.) | 1.8% |
| | Deionized water | Balance |
| 5. | Z6020 | .89% |
| | Maldene 286 - copolymer of maleic anhydride and butadiene (Lindau Chemicals, Inc.) | 13.3% |
| | Ammonium hydroxide at 28% active content | 1.6% |
| | Deionized water | Balance |

The foregoing are examples of binder formulations that have been evaluated and found useful in the process of the invention. The artisan may select other suitable binder formulations or other components that may be used. Indeed, an advantage of the invention is that almost all aqueous sizing formulations used in glass fiber forming technology should be useful as binders for spraying onto the fibers in the tumbling apparatus in accordance with the process of the invention.

To ensure good coverage of the fiber strands, it is preferred that the hydrating fluid be applied to the strand segments as they enter the pelletizer and before they begin to coalesce into pellets. If the hydrating fluid is applied at other locations within the pelletizer, there is a tendency for pellets to form before the chopped strands are completely coated with the hydrating fluid, which results in pellets formed of fibers that are not all coated with the hydrating fluid. When such pellets are used in the manufacture of fiber reinforced plastic articles, the uncoated fibers lack the interfacial coating required to provide good reinforcing characteristics, and the resulting article will have less than optimal properties. The hydrating fluid may be applied using applicators designed for spray coating, aerosol coating, or solution coating. Preferably, the pelletizer is equipped with one or more spray nozzles located adjacent to the strand segment inlet for spraying the hydrating fluid onto the strand segments as they enter the pelletizer.

The pelletizer used in the present invention can be any apparatus capable of tumbling the strand segments in such a way that: (1) they become substantially uniformly coated with the hydrating fluid comprising the aqueous binder/sizing composition, and (2) multiple chopped strand segments align and coalesce into pellets of the desired size. Such a tumbling apparatus should have an average residence time sufficient to insure that the strand segments become substantially coated with the hydrating fluid and form pellets, but insufficient for the pellets to be damaged or degraded through abrasion by rubbing against one another. Preferably, the residence time in the tumbling apparatus is from about 1 minute to about 10 minutes. More preferably, the residence time in the tumbling apparatus is from about 1 minute to about 3 minutes.

A preferred pelletizer is a rotating drum, such as drum 41 shown in FIG. 1a. The pelletizer 41 receives chopped strand segments 24, which may be prepared using a fiber-forming bushing 11, size applicator 13, gathering shoe 14, and chopping device 20.

In a preferred embodiment, the apparatus is provided with a system for monitoring and/or adjusting various parameters, which may be automatically controlled via a control panel 70, such as an Allen Bradley PLC-5/40 PLC system. If desired, the moisture content of the incoming strand segments 24 may be measured using suitable means 71. A strand-weighing device 72 may be provided and suitably located, e.g., before, after, or in association with strand conveyor 30. A similar weighing device may be used to monitor the weight of the pellets on conveyor 31. Metering of binder and water may be achieved by controlling pumps 33 and 34.

The drum 41 is adapted to accommodate a spray head for applying the hydrating fluid to the strand segments 24 as they enter the drum. Preferably, an external air-mixing nozzle 47 is mounted in the drum near its inlet for mixing of an aqueous binder composition, which may be supplied via a Masterflex pump 33 from a binder supply 35, with any additional water, which may be supplied via a Masterflex pump 34 from a water supply 36, required to bring the moisture content of the chopped strand segments to the desired level and apply the mixture to the chopped strand segments in the drum. The binder composition and water are combined into one fluid stream through the nozzle orifice, which is then hit with two jets of air positioned 180 degrees apart and at an angle of 60 degrees to the direction of the stream flow. This effectively creates a mist that is propelled onto the surface of the tumbling strand segments in the drum. Rotation of the drum causes the wet strand segments to tumble around one another while the surface tension created by the wet sizing or coating causes strand segments contacting one another over a substantial portion of their length to align with one another and coalesce into a cylindrically shaped pellet. By such action, any fines or single fibers created during the chopping operation are recombined with and incorporated into the forming pellets to essentially eliminate individual fine fibers from the resulting pellets. Preferably, the drum is tilted slightly so that the end of the drum from which the pellets exit is lower than the end in which they enter to ensure that the pellets formed in the drum do not remain in the drum for an excessive period of time. In a preferred embodiment, the drum is tilted such that its axis of rotation is at an angle ($\theta$) of from about 1 degree to about 3 degrees from horizontal. The angle of tilt may be adjusted manually or automatically using appropriate adjustments means 43a.

The size of the pellets formed in the drum is controlled primarily by the moisture content of the strand segments. If the moisture content is maintained at a high level, a greater number of strand segments will coalesce into a pellet and the pellet will thus be of larger diameter. Conversely, if the moisture is maintained at a lower level, fewer strand segments will coalesce into a pellet and the pellet will thus have a smaller diameter.

Preferably the pellets formed by the process of the invention have a diameter of from about 20% to about 65% of their length. Such pellets are typically formed by combining from about 70 strand segments to about 175 strand segments, each containing from about 500 individual filaments per strand to about 2000 individual filaments per strand.

The size of the pellets is also affected by the drum throughput. If the drum throughput is high, the strand segments have a shorter residence time in the drum. The shorter residence time tends to result in the formation of smaller pellets because the fluid application does not disperse on the strands and the strands will not coalesce into a pellet. However, because the pellets that are formed are in the drum for a shorter period of time, less compaction of the pellets occurs.

Although some compaction of the formed pellets invariably occurs in the pelletizer, it is typically insufficient to increase the pellet density to a level providing optimum flowability. For this reason, it is generally preferred that, after their formation in the pelletizer 41, the pellets are fed into a second tumbler or densifier 42 wherein the pellets are further compacted and densified. Any low-impact tumbling apparatus that will compact the pellets without degrading them through abrasion or otherwise damaging the pellets can be used. Preferably, the densifier has a gentler, less vigorous tumbling action than that of the pelletizer to minimize such degradation of the pellets. Furthermore, the densifier preferably has an average residence time of less than about 5 minutes, to ensure that the pellets are not degraded through abrasion. More preferably, the average residence time in the densifier is from about 1 minute to about 2 minutes.

Figure 1B:
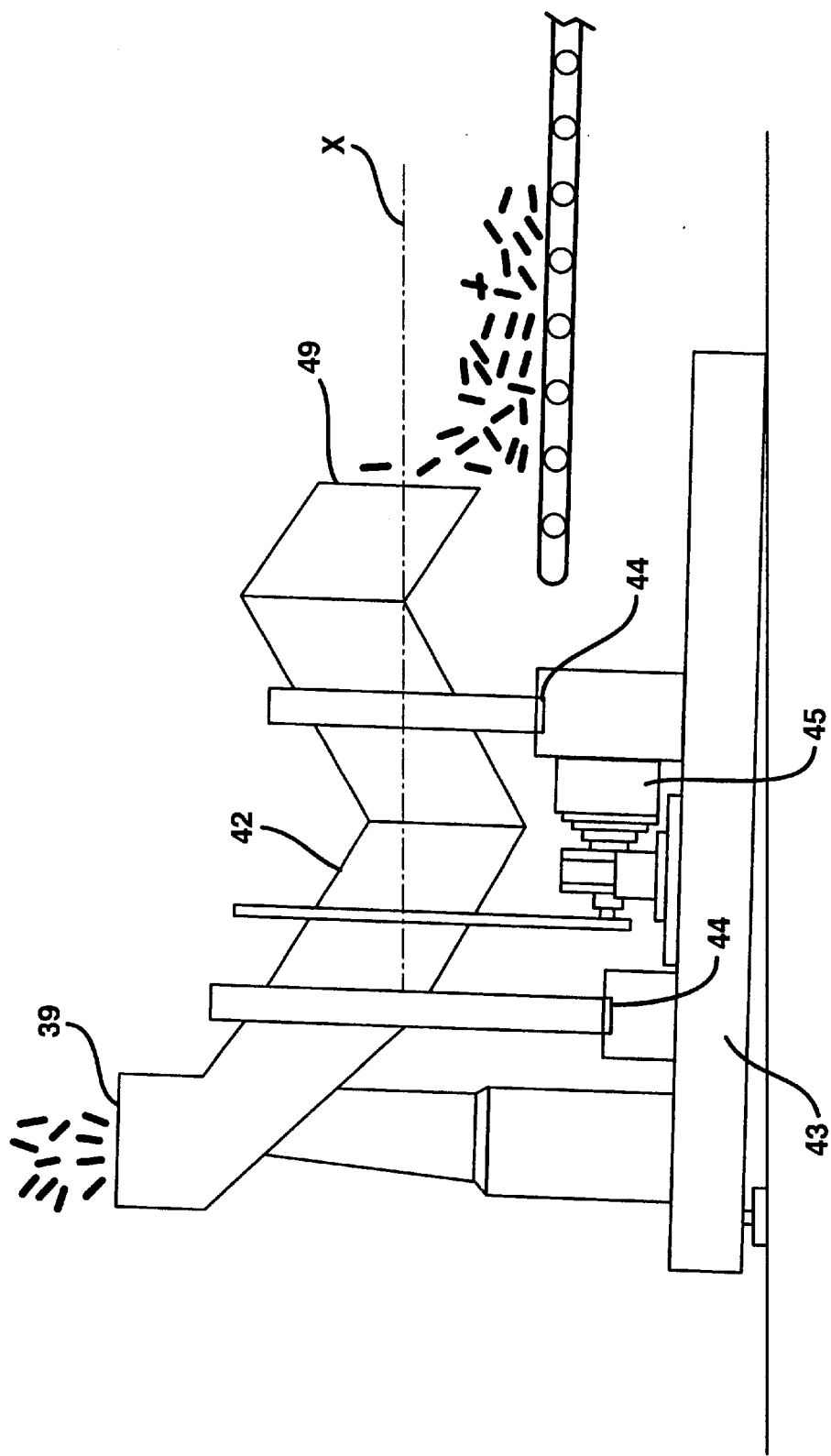
FIG. 1b is a frontal view of a preferred embodiment of a pellet densifying system useful in the invention.

A preferred densifier is a zig-zag tube adapted to be rotated about its longitudinal axis (x) as shown in FIG. 1b. The zig-zag tube 42 is rotationally mounted on a frame 43 via caster assemblies 44 and rotationally driven by drive motor 45. As the tube is rotated, pellets in the tube are gently tumbled about by the tube's rotation as they are pulled through the tube by gravity. As with the rotating drum above, the zig-zag tube densifier is preferably tilted at a slight angle to ensure that the pellets flow through the apparatus without excessive residence times. Preferably the longitudinal axis of the tube is at an angle of from about 1 degree to about 3 degrees from horizontal, with the tube inlet 39 being higher than the tube outlet 49.

Figure 2:
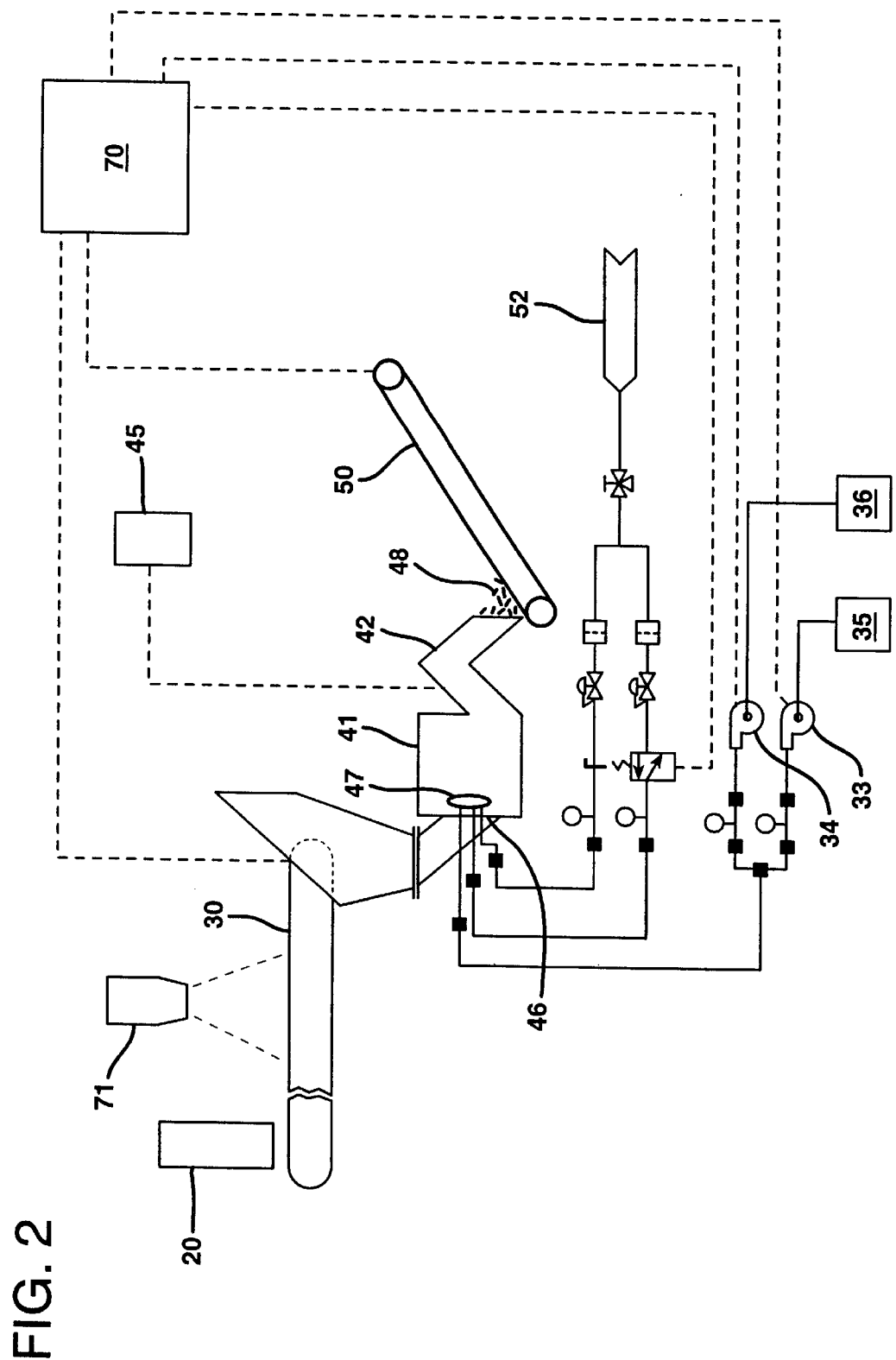
FIG. 2 is a frontal view of a preferred embodiment of a blender apparatus for performing pelletizing and densifying steps.

Although pellet formation and densification may occur in separate apparatuses, such as a separate rotary drum 41 and a rotating zig-zag tube 42 with a conveyor 31 therebetween as shown in FIG. 1a, the process of the present invention may be accomplished using other suitable means. For example, pellet formation and densification may occur in separate tumbling regions or zones within a single apparatus. A preferred example of such an apparatus is a "Zig-Zag" blender commercially available from Patterson Kelly, which is illustrated in FIG. 2 and at 40 in FIG. 3.

Blender 40 comprises a rotating drum 41 connected to a zig-zag tube 42 at one end of the drum. Both the drum 41 and tube 42 are rotationally mounted on a frame 43 via caster assemblies 44 and rotationally driven by a variable-speed motor 45. The zig-zag tube is attached to the drum at a location radially distant from the rotational center of the drum and is in flow communication therewith such that upon each revolution of the drum, material inside the drum will flow into the tube as the tube attachment site goes below the level of material in the drum. The chopped strand segments 24 enter pelletizing drum 41 through inlet 46. The incoming strand segments are sprayed with a hydrating fluid or solution, preferably containing binders, film formers, lubricants, antistats, and coupling agents, through spray nozzle 47 located adjacent inlet 46. The rotation of pelletizing drum 41 causes the strand segments inside the drum to tumble over and around one another, which distributes the hydrating solution over the surface of the strand segments and causes the strand segments to align and coalesce into pellets 48. The pellets found in the drum pass into zig-zag tube 42 through an opening 41a in the outlet end of the drum and are further densified in the zig-zag tube 42.

In a preferred embodiment, drum 41 has an interior baffle to reduce the free-fall distance of the glass pellets and strand segments during rotation of the drum. By reducing this distance, less deterioration of the glass fibers and pellets occurs through impact and abrasion which can provide improved physical properties in the glass fiber reinforced molded articles manufactured therefrom.

Figure 5A:
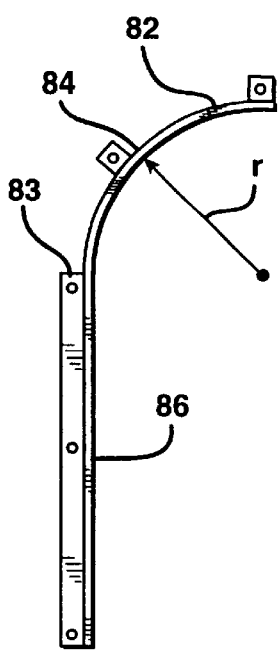
FIG. 5(a) is a side edge view of an alternative baffle that can be used in the rotary drum of the invention.
Figure 5B:
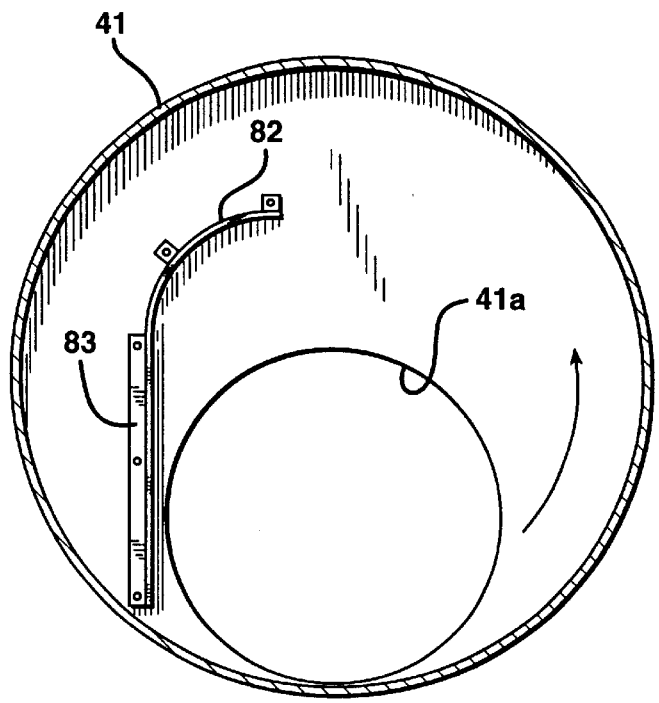
FIG. 5(b) is a radial cross-sectional view of a rotary drum of the invention with the baffle of FIG. 5(a) installed therein.
Figure 5C:
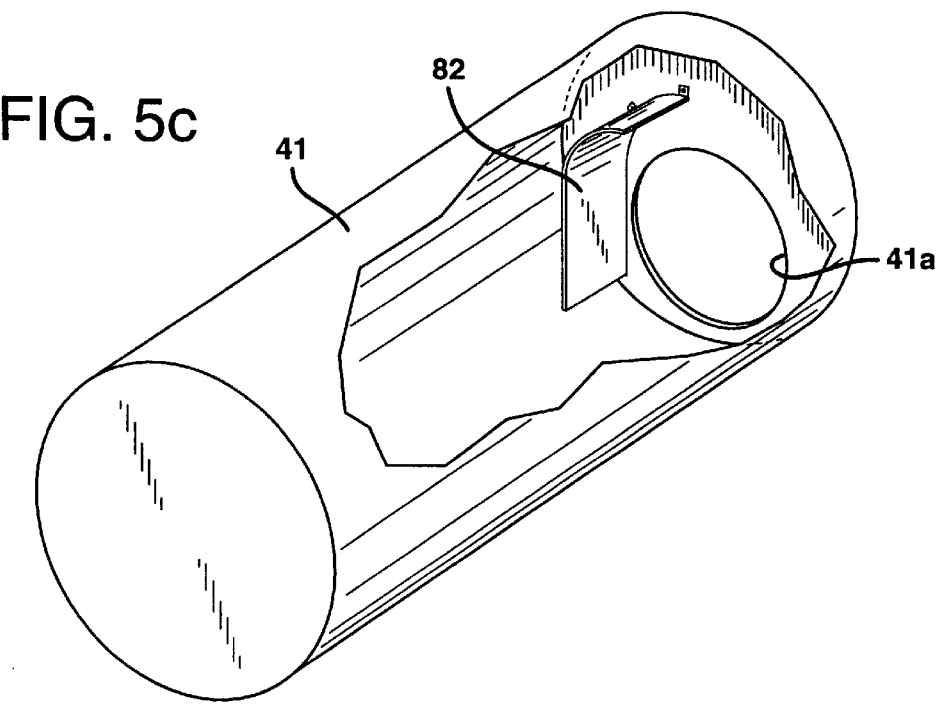
FIG. 5(c) is a cut-away isometrical view of the rotary drum and installed baffle of FIG. 5(b).

While suitable baffles may take many forms, particularly preferred configurations include generally cylindrical baffles as illustrated in FIG. 4, and curved plate baffles as shown in FIG. 5. Such baffles are preferably attached to the exit end wall of drum 41 and project inwardly therefrom a distance of from about 10 to about 50 percent of the drum's length. The baffles may be made of any material that will withstand the operating conditions inside the drum, e.g., stainless steel, and can be attached to the drum wall by bolts, screws, welding or other suitable means. Where fastening hardware such as bolts or screws are used, the edges of the baffles adjacent the drum wall preferably have flanges 83 formed therein to facilitate attachment.

As shown in FIG. 4, the generally cylindrical baffle 80 is preferably hollow with sealed ends that prevent glass from entering, and is mounted on the exit end wall of drum 41 so that its central longitudinal axis corresponds approximately to that of the drum. As used herein, "generally cylindrical" is meant to include true cylinders as well as pseudo cylindrical members having flattened, tapered or cut-out portions, or varying radii over portions of their length. Preferably such baffles have a diameter of from about 20 to about 35 percent of the drum's diameter to provide a sufficient reduction in the free-fall of the pellets to reduce deterioration of the fibers. Further, the diameter of the baffle may advantageously decrease along at least a portion of the baffle's length such that the internally projecting end of the baffle is of smaller diameter than the end attached to the drum. Providing the baffle with such a shape serves to minimize its impedance to the longitudinal flow of glass through the drum. Preferably, the internally projecting end of the baffle has a diameter of from about 25 to about 60 percent of the diameter of the drum.

Additionally, the baffle is preferably mounted on the exit end wall of the drum such that it partially overlaps the exit opening 41a of the drum to reduce back flow of pellets from the zig-zag tube densifier 42 into the drum as the unit rotates. This correspondingly reduces the average residence time of the pellets in the drum and helps ensure that the pellets are not damaged or degraded by excessive abrasion. Preferably, the baffle blocks from about 20 to about 30 percent of the area of the exit opening. Further, as shown in FIG. 4, the portion of the baffle overlapping the exit opening can be flattened, tapered or otherwise modified as desired to enhance its reduction of pellet back flow while minimizing its obstruction to the flow of pellets into the zig-zag tube densifier.

As shown in FIG. 5, preferred curved plate baffles generally have a curved portion 84 and a linear portion 86 and are mounted on the exit wall of the drum perpendicular thereto to project inwardly into the interior of the drum. The curved portion of the baffle preferably has a substantially constant radius of which will match the radius of the exit opening, and the linear portion is preferably of an equivalent height as the exit opening.

Further, as shown in FIG. 5, the baffle is preferably mounted on the drum wall with the linear portion being adjacent to the rotationally trailing edge of the exit opening 41a such that, when the exit opening is at the bottom of its rotation, the linear portion is vertically oriented and the curved portion curves toward the drum's central axis above the exit opening. By orienting the baffle in this manner, it not only reduces the free-fall distance of the pellets during the drum's rotation, but also acts as a scoop or guide to facilitate flow of the pellets through the exit opening into the zig-zag tube densifier by increasing the apparent head of glass pellets available to flow into the densifier with each rotation of the drum. As such, it also helps reduce the average residence time of the pellets in the drum and prevent excessive abrasion of the pellets.

Inclusion of the aforementioned baffles in the drum of the pelletizer has been found to reduce the average residence time of the pellets in the drum from about 2 minutes and 35 seconds without a baffle, to about 1 minute and 40 seconds for the generally cylindrical baffle and 1 minute and 20 seconds for the curved plate baffle. Further, the apparent reduction in fiber degradation resulting from the inclusion of such baffles is evident from an increase in the physical properties of articles molded from the resulting pellets, including average increases in tensile strength of from about 2 to about 3 percent, increases in flexural strength of from about 1 to about 2 percent, and increases in impact strength of from about 4 to about 5 percent.

By varying the throughput and moisture content of the glass strand segments, glass fiber pellets can be made that are from about 13% to about 60% denser than the corresponding unpelleted glass strand segments, and from about 10 times to about 65 times larger in diameter. For example, chopped 4-mm (length) segments of a 2000-filament strand composed of 14-micron (diameter) fibers typically have a bulk density of from about 33 lb/ft$^3$ (528.66 kg/m$^3$) to 36 lb/ft$^3$ (576.72 kg/m$^3$). After being hydrated to a moisture content of from about 13 percent to about 14 percent and formed into densified pellets according to the process of the invention, the resulting dried pellets typically have a bulk density of from about 40 lb/ft$^3$ (640.8 kg/m$^3$) to about 55 lb/ft$^3$ (881.1 kg/m$^3$). As a result of their increased diameter-to-length ratio and increased density, the resulting pellets exhibit significantly improved flowability in comparison to the unpelleted chopped strand product.

After densification, the pellets may be delivered onto a conveyor belt 50 and dried in a suitable drier apparatus. For example, the pellets may be passed through a hooded oven supplied with hot air 61 and cooling air 62 or any suitable drying means 60. In order to reduce drying time to a level acceptable for commercial mass production, it is preferred that the fibers are dried at elevated temperatures of from about 250° F. (121.1° C.) to about 560° F. (293.3° C.) in a fluidized-bed oven. After drying, the densified pellets 48 are preferably coated with a thin layer of a curable, polymer-forming binder composition. Suitable binder compositions may include any conventional binder that: (1) will provide the desired toughness to the pellet; (2) is compatible with the constituents of the glass fiber pellets and the matrix material being reinforced therewith; and (3) can be cured to a non-tacky state by a mechanism that does not degrade the pellets. Useful binders may include polyvinyl alcohol, polyvinyl acetates, polyvinyl pyrrollidone, tetrafluoroethylene fluorocarbon polymers (e.g., Teflon), acrylics, acrylates, vinyl esters, epoxies, starches, waxes, cellulosic polymers, polyesters, polyurethanes, silicone polymers, polyether urethanes, polyanhydride/polyacid polymers, polyoxazolines, polysaccharides, polyolefins, polysulfones and polyethyleneglycols. Preferably, such binders are thermoplastic or can be cured with heat or exposure to radiation. Preferred binders provide a low friction, high strength coating and include polyvinyl alcohol, polyvinyl pyrollidone, silicone polymers, polyethylene glycols and vinyl halide polymers such as Teflon.

As one skilled in the art will recognize, the binder may be applied using a coating applicator selected from one of a variety of devices, such as electrostatic spray applicators for powders, or conventional sprayers for liquid binder solutions, suspensions or emulsions. Depending on the nature of the binder selected, subsequent heating of the binder coated pellets may be required to evaporate solvents or liquid carriers, cause the binder to flow and cover the pellet surface, and/or to cure the binder.

Generally, it is preferred to apply the binder to the pellets as an aqueous solution, emulsion or dispersion as the pellets leave the drying oven, and while the pellets are still at a sufficient temperature to at least partially evaporate the water, cause the binder to flow over the surface of the pellet, and/or cure the binder to a non-tacky state. Preferably, the pellets leave the oven at a temperature in excess of about 260° F. (126.7° C.). Accordingly, some modification of conventional drying ovens may be necessary to remove or regulate cooling regions to ensure the pellets exit the oven at the desired temperature. Additionally, further heating of the binder coated pellets may be provided, if required, by passing the pellets through a second drying oven after binder application.

Figure 6:
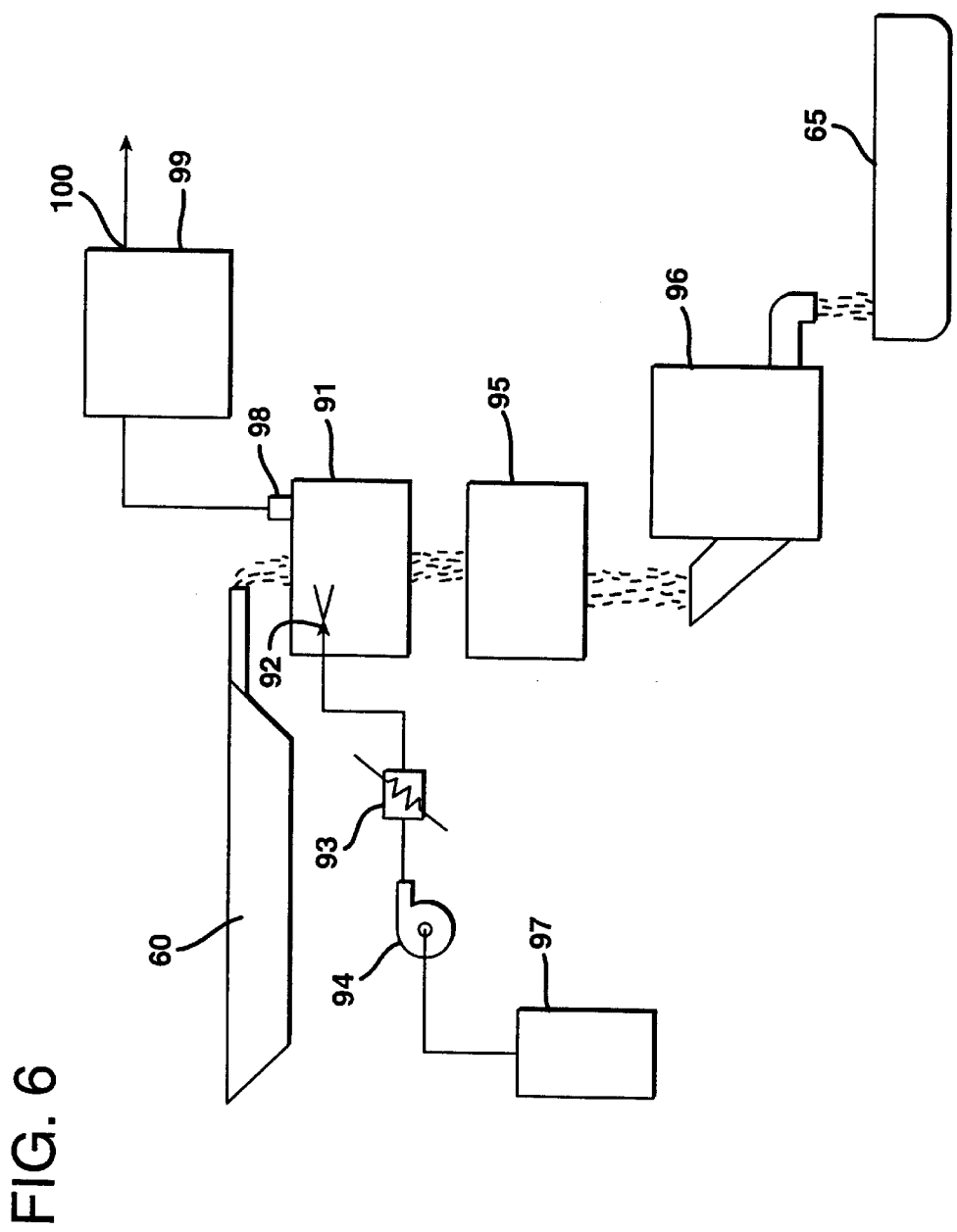
FIG. 6 is a diagram of an apparatus for applying a coating of a polymeric binder to the pellets that is useful in the invention.

While the binder may be applied to the pellets by any means that will substantially coat the pellet surface, the pellets are preferably coated with binder by passing through a suitable spray chamber as shown in FIG. 6. As the pellets fall through the spray chamber 91, the binder material is sprayed onto the surface of the pellets through the spray nozzle 92. The binder material may advantageously be heated using an inline heater 93 to get the binder temperature up to about 95° F.–100° F. (35° C.–82.2° C.), or hotter, depending on the temperature sensitivity of the binder chemistry. The binder is preferably metered from supply reservoir 97 to the inline heater by a positive displacement pump 94 and forced through spray nozzles 92 for application to the pellets 48. As the binder passes through the nozzle, the composition is dispersed into a mist of small droplets for application to the glass pellet surface, and the sudden drop in pressure causes a portion of the water present in the binder droplets to instantaneously phase change to steam. This vaporization in turn reduces the water volume in the spray and facilitates drying/curing of the binder composition. When the remaining binder containing mist hits the pellet surface, the remainder of the water is boiled off, leaving the binder on the surface of the pellets. The evaporation of the water from the composition also advantageously reduces the temperature of the glass pellet.

The spray chamber 91 is preferably equipped with an exhaust port 98 connected to a suitable scrubber 99 for collecting binder overspray to minimize binder build-up inside the spray chamber. After scrubbing, the vapors withdrawn from the spray chamber may be vented from the scrubber through vent opening 100.

Alternatively, the pellets may be coated with a light-curable binder composition that is cured by passing the binder-coated pellets through a suitable light curing chamber. Useful light-curable binders may include UV curable polyurethanes, acrylates and epoxies. When such binders are used, the spray apparatus is preferably modified as shown in FIG. 6 to include a UV or other suitable light chamber 95 through which the binder coated pellets are passed to cure the binder. The light chamber may be located adjacent to the spray chamber or it may be removed therefrom. However, it is generally preferred that the spray chamber be directly above the light chamber and in flow communication therewith such that the pellets freely fall through first the spray chamber and then through the light chamber as shown in FIG. 6.

After curing the binder coating, the coated pellets may then fall into a tumbling drum 96, which can be heated or cooled as required by the process. The drum acts to separate any pellets that have become adhered together and normalizes the temperature of the finished product. The pellets may then be classified by size, if desired, using a syntron, screen or any other suitable device 65.

Alternatively, the spray chamber 91 and tumbling drum 96 may be combined into a single unit such that the binder is sprayed onto the pellets as they enter the drum or while inside the drum. A preferred apparatus for coating the pellets with binder while tumbling the pellets to prevent agglomeration during binder cure is a Zig-Zag blender commercially available from Patterson Kelly which is illustrated at 40 in FIG. 3 and described above.

Figure 3:
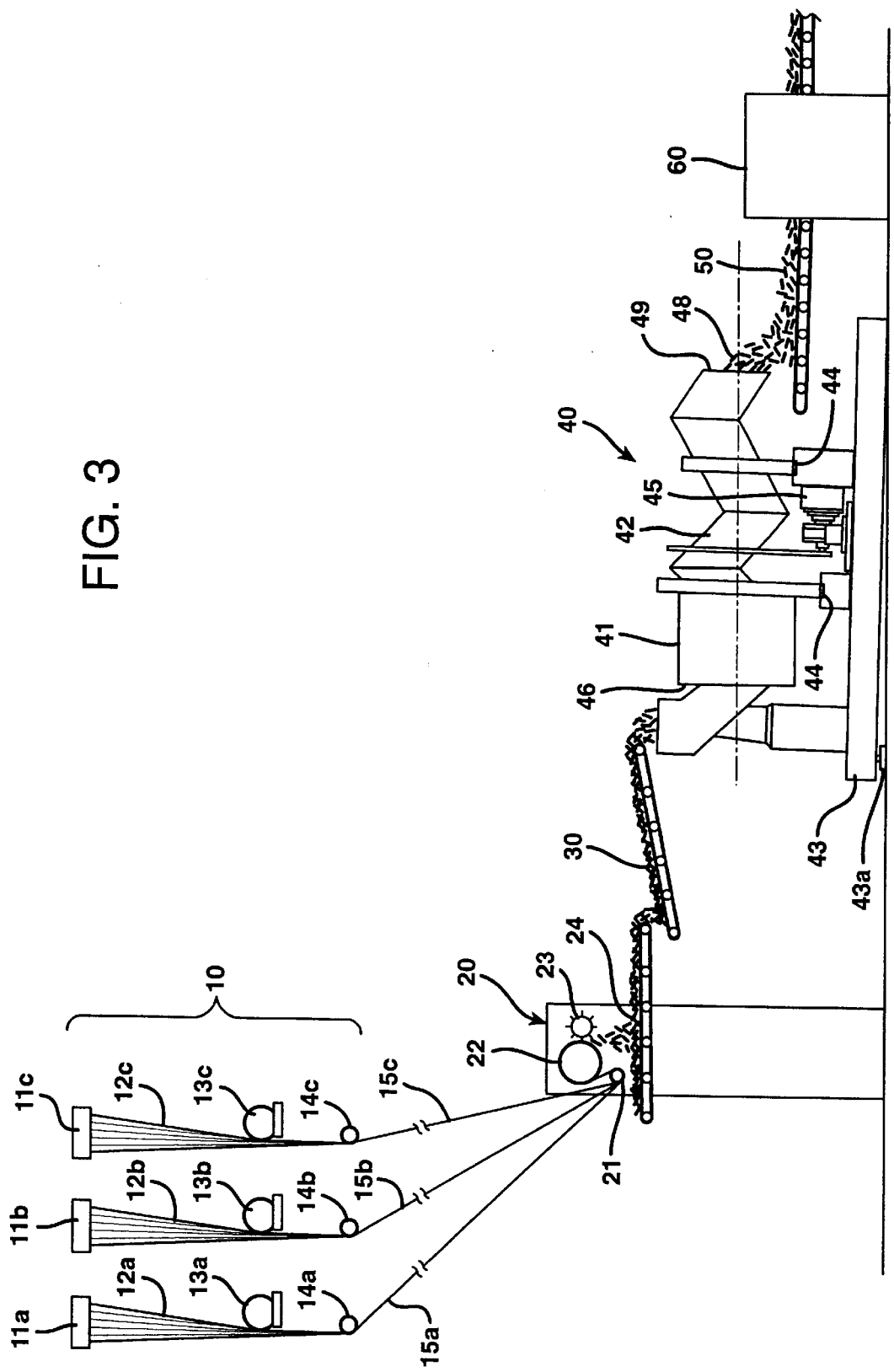
FIG. 3 is a diagram of a preferred apparatus of the invention for forming fibers and processing them into densified pellets substantially encapsulated in a polymer shell.
Figure 4A:
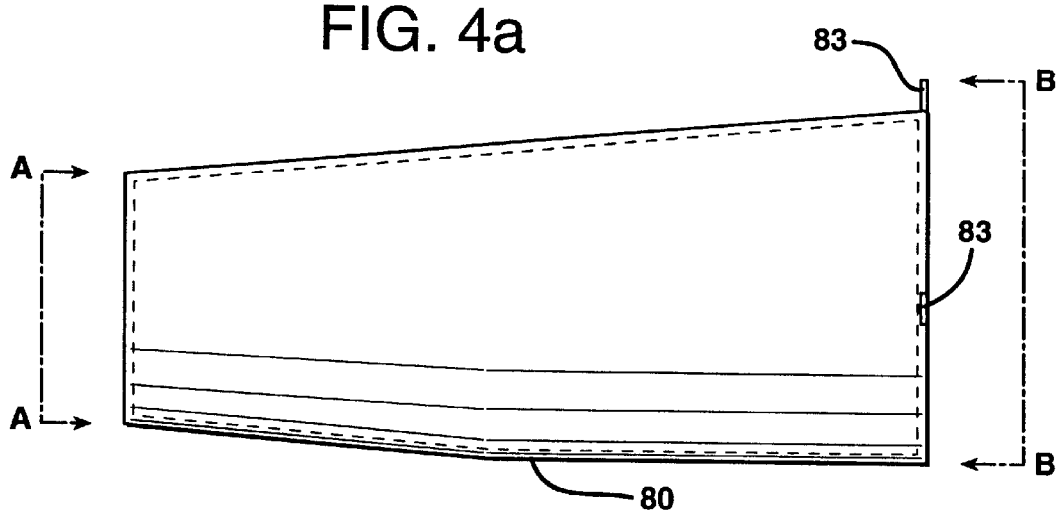
FIG. 4(a) is a longitudinal cross-section view of a baffle that can be used in the rotary drum of the invention.
Figure 4B:
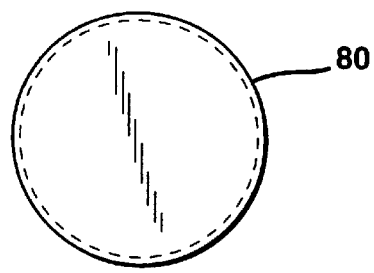
FIG. 4(b) is an end view of the baffle shown in FIG. 4(a) taken along line A—A.
Figure 4C:
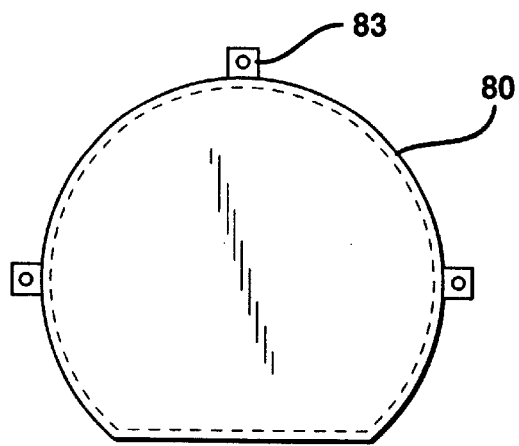
FIG. 4(c) is an end view of the baffle shown in FIG. 4(a) taken along line B—B.
Figure 4D:
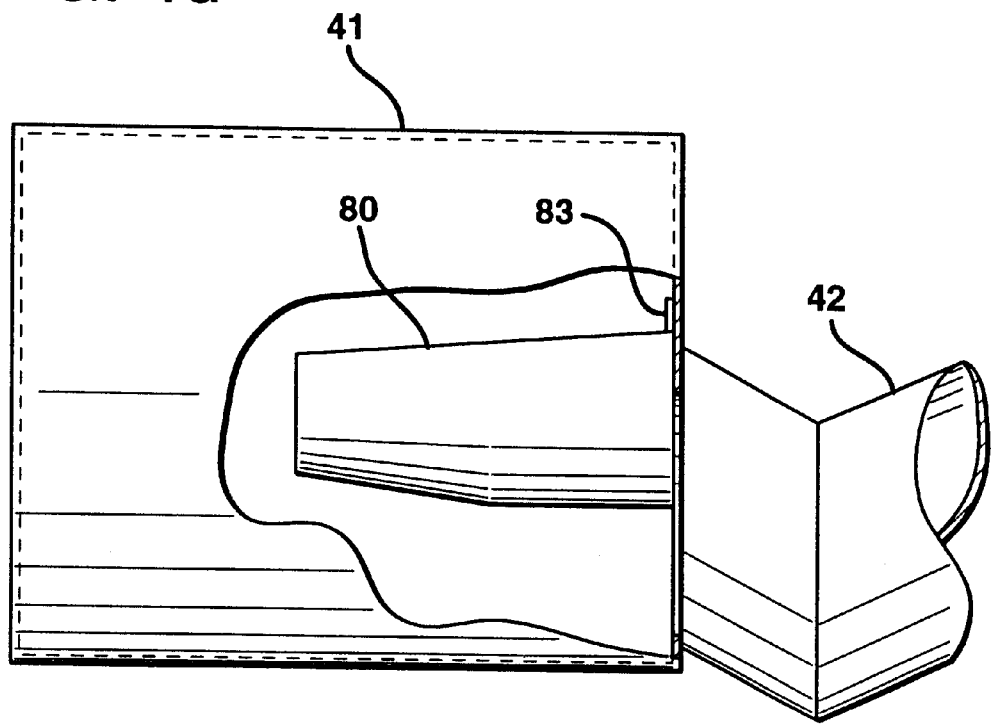
FIG. 4(d) is a longitudinal cross-sectional view of a rotary drum of the invention with the baffle of FIG. 4(a) installed therein.
Figure 4E:
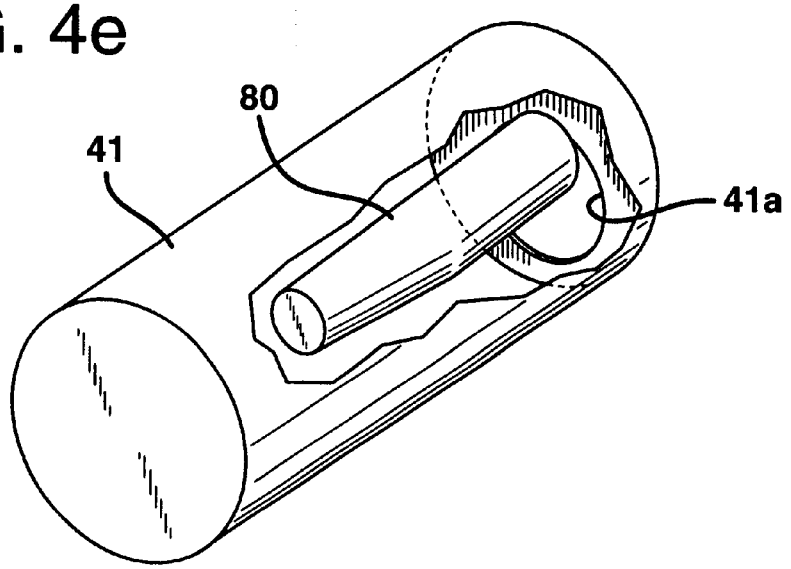
FIG. 4(e) is a cut-away isometrical view of the rotary drum and installed baffle of FIG. 4(d).

The process of the invention is preferably carried out with an apparatus as depicted in FIG. 3, wherein fiber strands are formed in fiber-forming apparatus 10, chopped using cutting device 20, and transported by conveyor 30 to tumbling apparatus 40 where the chopped strands are pelletized and densified. The resulting pellets are transported by conveyor 50 to drying device 60, and then passed through binder applicator 90 where the pellets are coated with a suitable polymeric binder composition.

The fiber-forming apparatus 10 preferably includes a glass fiber-forming furnace having fiber-forming bushings 11*a*, 11*b*, and 11*c* from which a multiplicity of filaments 12*a*, 12*b*, and 12*c* are drawn or attenuated, and to which are applied an aqueous sizing composition containing coupling agents and optional lubricants and pH adjusters by means of sizing applicators such as rolls 13*a*, 13*b*, and 13*c*. The groups of filaments are then collected into independent strands 15*a*, 15*b*, and 15*c* by means of gathering shoes 14*a*, 14*b*, and 14*c*, and are then introduced into cutting device 20.

Cutting device 20 includes a guide roller 21 having grooves of a number corresponding to the number of the strands, a freely rotatable feed roller 22 having a surface made of an elastic material having a large coefficient of friction with respect to glass fibers, e.g., rubber or synthetic resin, and a cutter roller 23 resiliently pressed against the feed roller 22 and driven positively by a motor, the cutter roller having a multiplicity of blades projecting radially therefrom. The wetted strands 15*a*, 15*b*, and 15*c* introduced into the cutting device 20 are wound round the feed roller 22 past the groove of the guide roller 21, and are cut at the point of contact between the feed roller 22 and the and the blades of the cutter roller 23, into pieces, i.e., chopped strands 24, of a length which is determined by the circumferential pitch of the blades.

The chopped strands 24 are dropped onto a suitable conveying means such as conveyor 30, and are conveyed to the tumbling apparatus 40. The preferred conveyor for transporting the wet chopped strand segments is a belt conveyor having a dimpled, non-stick surface, such as that commercially available from Sparks under the trade designation Ultraline Food Belt Monoflex WU220M (white polyurethane with mini diamond top cover).

The tumbling apparatus 40 comprises a pelletizing drum 41 rigidly secured at one end to a hollow, zig-zag pellet densifying tube 42 rotationally mounted on a frame 43 via caster assemblies 44 and rotationally driven by drive motor 45, e.g., a 30-amp variable-speed motor. The densifying tube 42 is attached to the drum 41 at a location radially distant from the rotational center of the drum and is in flow communication therewith. Preferably, the working volume of hydrated strand segments and pellets within the drum is from about 20% to about 50% of the drum volume, more preferably about 50% of the drum volume, to ensure a retention time within the drum to form pellets but insufficient to degrade them through abrasion.

The densified pellets pass from the drum 41 through the densifying tube 42, and emerge from the densifying tube at its outlet 49. The density of the pellets emitted from the densifying tube is preferably from about 46 lb/ft$^3$ (736.92 kg/m$^3$) to about 62 lb/ft$^3$ (993.24 kg/m$^3$), which includes about 14% moisture content by weight.

Tumbling apparatus frame 43 is preferably provided with elevation-adjusting means 43*a*, to allow the tumbling apparatus to be maintained at a slight angle up to about 5 degrees from horizontal to ensure proper flow of material through the pelletizing drum and densifying tube. In a preferred embodiment of the invention, the angle is from about 1 degree to about 3 degrees.

The pellets emerging from the densifying tube fall onto conveyor 50 and are transported to oven 60, where the hydrating solution is dried. Preferably, conveyor 50 is a belt conveyor having a dimpled, non-stick surface commercially available from Sparks under the trade designation Ultraline Food Belt Monoflex WV220M (white polyurethane with mini diamond top cover).

The dried pellets leave oven 60 and are introduced into spray chamber 91 wherein they are coated on their surface with a binder composition. The binder composition is sprayed onto the pellets 48 from spray nozzles 92 as they pass through the spray chamber 91. The binder is preferably withdrawn from a suitable reservoir 97 and is forced through the spray nozzles 92 by a positive displacement pump 94 and suitable tubing. An inline heater 93 may be included between the pump and the nozzles to regulate the temperature of the binder to facilitate its cure and drying. If the binder is light curable, the pellets pass from spray chamber 91 into light chamber 95 wherein they are subjected to radiation of a suitable wavelength to cure the binder composition.

The binder-coated pellets may then be introduced into a tumbling drum 96 or other suitable apparatus to separate any pellets that may have become adhered together, and to normalize the temperature of the pellets. Thereafter, the pellets may be graded or classified by size using a syntron or other suitable device 65, and packaged or stored in bulk form.

Although the invention has been described in detail in reference to preferred features and embodiments, various modifications will become readily apparent to artisans through practice of the invention. Accordingly, the invention is intended not to be limited by the foregoing description, but to be defined by the appended claims and their equivalents.

What is claimed is:

1. An apparatus for producing glass fiber pellets substantially encapsulated in a polymeric shell from chopped segments of multi-filament glass strand comprising:
   a. an applicator for applying an aqueous hydrating solution to chopped glass segments formed from a multi-filament glass strand;
   b. a pelletizer for imparting a tumbling action to said chopped strand segments, said pelletizer having a residence time sufficient to ensure that the chopped glass segments become substantially coated with the hydrating fluid;
   c. a drier; and
   d. a binder coating applicator.

2. The apparatus of claim 1, wherein said binder coating applicator comprises a chamber having spray nozzles mounted therein in flow communication with a reservoir containing a binder coating composition.

3. The apparatus of claim 2, wherein said flow inducing apparatus is a positive displacement pump disposed between the reservoir and the spray nozzles.

4. The apparatus of claim 2 further comprising a heater disposed between said reservoir and said nozzles.

5. The apparatus of claim 2 wherein said drier comprises an oven.

6. The apparatus of claim 2 further comprising a curing chamber.

7. The apparatus of claim 6, wherein said curing chamber comprises a chamber having an opening therein through which ultraviolet radiation of a wavelength suitable for curing the binder composition is introduced; and a radiation source.

8. The apparatus of claim 2, further comprising a second tumbler, and a conveyor belt disposed between the first tumbler and the second tumbler.

9. The apparatus of claim 8, wherein said first tumbler comprises a drum rotationally driven about its longitudinal axis, said drum having a first and second end, said first end having an inlet opening for receiving said pellets and said second end having an outlet opening for discharging said pellets, the center of said outlet opening being radially distant from the rotational axis of said drum.

10. The apparatus of claim 9, wherein said second tumbler comprises a zig-zag hollow tube rotationally driven about a longitudinal axis, said tube having a first and second open end, said first open end providing an inlet for receiving said pellets and said second open end providing an outlet for discharging said densified pellets.

11. The apparatus of claim 10, wherein said second tumbler is connected to the outlet opening of said first tumbler and is in flow communication therewith.

12. The apparatus of claim 1 further comprising a densifier.

13. An apparatus for producing glass fiber pellets substantially encapsulated in a polymeric shell from chopped segments of multi-filament glass strand comprising:
   a. a hydrating solution applicator;
   b. a drum rotationally driven about its longitudinal axis, said drum having a first and second end, said first end having an inlet opening and said second end having an outlet opening, the center of said outlet opening being radially distant from the rotational axis of said drum;
   c. a zig-zag hollow tube rotationally driven about a longitudinal axis, said tube having a first and second open end, said first open end being attached to said outlet opening of said drum such that material within said drum can pass into said tube upon rotation of said drum and tube, said second open end providing a discharge outlet;
   d. an oven having an inlet and an outlet; and
   e. a spray chamber equipped with spray nozzles disposed therein.

14. The apparatus of claim 11, wherein said spray chamber comprises a second drum rotationally driven about its longitudinal axis, said second drum having a first and second end, said first end having an inlet opening and said second end having an outlet opening.

15. The apparatus of claim 11, further comprising a second zig-zag hollow tube having a first and second open end, said first open end being in flow communication with said outlet opening of said second drum and providing a receiving inlet, and said second open end providing a discharging outlet.

* * * * *